United States Patent
Brettle et al.

(10) Patent No.: US 10,158,963 B2
(45) Date of Patent: Dec. 18, 2018

(54) AMBISONIC AUDIO WITH NON-HEAD TRACKED STEREO BASED ON HEAD POSITION AND TIME

(71) Applicant: GOOGLE INC., Mountain View, CA (US)

(72) Inventors: Jamieson Brettle, Mountain View, CA (US); Andrew Allen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 6 days.

(21) Appl. No.: 15/419,312

(22) Filed: Jan. 30, 2017

(65) Prior Publication Data

US 2018/0220251 A1    Aug. 2, 2018

(51) Int. Cl.
*H04S 7/00* (2006.01)
*H04S 3/00* (2006.01)
*G06F 3/01* (2006.01)
*H04R 5/04* (2006.01)

(52) U.S. Cl.
CPC .............. *H04S 7/303* (2013.01); *G06F 3/012* (2013.01); *H04R 5/04* (2013.01); *H04S 3/008* (2013.01); *H04S 2420/01* (2013.01); *H04S 2420/11* (2013.01)

(58) Field of Classification Search
None
See application file for complete search history.

(56) References Cited

U.S. PATENT DOCUMENTS

| | | |
|---|---|---|
| 6,766,028 B1 | 7/2004 | Dickens |
| 8,705,750 B2 | 4/2014 | Berge |
| 9,101,299 B2 | 8/2015 | Anderson |
| 9,215,544 B2 | 12/2015 | Faure et al. |
| 9,332,360 B2 | 5/2016 | Edwards |

(Continued)

FOREIGN PATENT DOCUMENTS

| | | |
|---|---|---|
| WO | 0155833 A1 | 8/2001 |
| WO | 2010020788 A1 | 2/2010 |

OTHER PUBLICATIONS

"Definition of Transitive", Merriam-Webster Dictionary, printed Sep. 26, 2017, 1 page.

(Continued)

*Primary Examiner* — Paul Huber
(74) *Attorney, Agent, or Firm* — Brake Highes Bellermann LLP

(57) ABSTRACT

Techniques of performing involve providing interactive audio in addition to ambisonic audio in stereo tracks selected according to the occurrence of events in a media delivery system. For example, a user of a VR system observes a virtual environment that contains many virtual objects. The user may experience binaurally rendered audio played over N ambisonic channels from any number of virtual loudspeakers. In addition, the user may also activate another audio source by positioning his/her head at a certain angle, e.g., to look at a particular virtual object. As a specific example, when the user looks at a picture of a person, an audio track may play over a pair of stereo channels N+1 and N+2. Because they are stereo channels, there is no need to perform convolutions with HRTFs. In this way, audio may be provided for all virtual objects in the virtual environment with a small computational overhead.

20 Claims, 5 Drawing Sheets

(56) References Cited

U.S. PATENT DOCUMENTS

| | | |
|---|---|---|
| 9,420,393 B2 | 8/2016 | Morrell et al. |
| 9,584,934 B2 | 2/2017 | Kim et al. |
| 2009/0116657 A1 | 5/2009 | Edwards et al. |
| 2013/0064375 A1 | 3/2013 | Atkins et al. |
| 2014/0355794 A1 | 12/2014 | Morrell et al. |
| 2016/0219388 A1 | 7/2016 | Oh et al. |
| 2016/0241980 A1 | 8/2016 | Najaf-Zadeh et al. |
| 2017/0245082 A1 | 8/2017 | Boland |

OTHER PUBLICATIONS

"Definition of Transitory", Merriam-Webster Dictionary, printed Sep. 26, 2017, 1 page.
Politis, et al., "JSAmbisonics: A Web Audio library for interactive spatial sound processing on the web", ReaserchGate, Ambisonics Processing on the Web, Sep. 23, 2016, 9 pages.
Rafaely, "Fundamentals of Spherical Array Processing", Spring Topics in Signal Processing, vol. 8, Chapter 1, 2015, 39 pages.
3GPP TR 26.918, V0.5.03; 3rd Generation Partnership Project; Technical Specification Group Services and System Aspects; Virtual Reality (VR) media services over 3GPP; (Release 14); Jan. 27, 2017; XP051218025; 44 pages.
International Search Report and Written Opinion for International Application PCT/US2017/067681, dated Mar. 16, 2018, 16 pages.
Curtis, et al., "The Making of Pearl, A 360 Degree Google Spotlight Story", Jul. 24, 2016, 1 page.
Ola, et al., "Crafting Cinematic High End VR Audio for Etihad Airways", Conference: 2016 AES International Conference on audio for Virtual and Augmented Reality; XP040681029, Sep. 21, 2016, 7 pages.

US 10,158,963 B2

AMBISONIC AUDIO WITH NON-HEAD TRACKED STEREO BASED ON HEAD POSITION AND TIME

TECHNICAL FIELD

This description relates to binaural rendering of sound fields in virtual reality (VR) and similar environments.

BACKGROUND

Ambisonics is a full-sphere surround sound technique: in addition to the horizontal plane, it covers sound sources above and below the listener. Unlike other multichannel surround formats, its transmission channels do not carry speaker signals. Instead, they contain a speaker-independent representation of a sound field called B-format, which is then decoded to the listener's speaker setup. This extra step allows the producer to think in terms of source directions rather than loudspeaker positions, and offers the listener a considerable degree of flexibility as to the layout and number of speakers used for playback.

360-degree video and virtual reality (VR) applications provide users with immersive visual experiences. In 360-degree video and VR applications, a similarly immersive audio experience typically requires more computing resources than are available to users. B-formatted ambisonic sound provides three-dimensional audio to a user with little additional computational cost. The ambisonic sound may be head-tracked so that the sound appears to originate from the same location regardless of where the user is looking.

SUMMARY

In one general aspect, a method can include performing, by a media delivery computer configured to produce the sound field in the ears of the human user, a convolution operation on an ambisonic portion of the sound field being output to the ears of the human user over a set of ambisonic sound channels with a head-related transfer function (HRTF) for that ear to produce a rendered ambisonic portion of the sound field in the ears of the human listener over the set of ambisonic sound channels. The method can also include receiving (i) a set of stereo tracks, each of the set of stereo tracks including audio data that, when processed by processing circuitry of the media delivery computer, output a portion of the sound field to the ears of the human user over a corresponding pair of stereo sound channels and (ii) electronic data defining a set of events, each of the set of events having an identifier identifying a respective stereo track of the set of stereo tracks. The method can further include receiving a message indicating that an event of the set of events has occurred. The method can further include in response to receiving the message, performing a track playing operation to cause the stereo track identified by the identifier of the event to output a stereo portion of the sound field over the pair of stereo sound channels to which the identified stereo sound source corresponds, the rendered ambisonic portion of the sound field and the stereo portion of the sound field being combined in the ears of the human user over the set of ambisonic sound channels and the pair of stereo sound channels.

The details of one or more implementations are set forth in the accompanying drawings and the description below. Other features will be apparent from the description and drawings, and from the claims.

DETAILED DESCRIPTION

While ambisonics in a conventional audio system provides an immersive audio experience for users of VR applications and 360-degree video using little computational resources, it does not provide an interactive experience for the users. In contrast, improved techniques involve providing interactive audio in addition to ambisonic audio in stereo tracks selected according to the occurrence of events in a media delivery system. For example, a user of a VR system observes a virtual environment that contains many virtual objects. The user may experience binaurally rendered audio played over N ambisonic channels from any number of virtual loudspeakers. In addition, the user may also activate another audio source by positioning his/her head at a certain angle, e.g., to look at a particular virtual object. As a specific example, when the user looks at a picture of a person, an audio track may play over a pair of stereo channels N+1 and N+2. Because they are stereo channels, there is no need to perform convolutions with HRTFs. In this way, audio may be provided for all virtual objects in the virtual environment with a small computational overhead.

Figure 1:
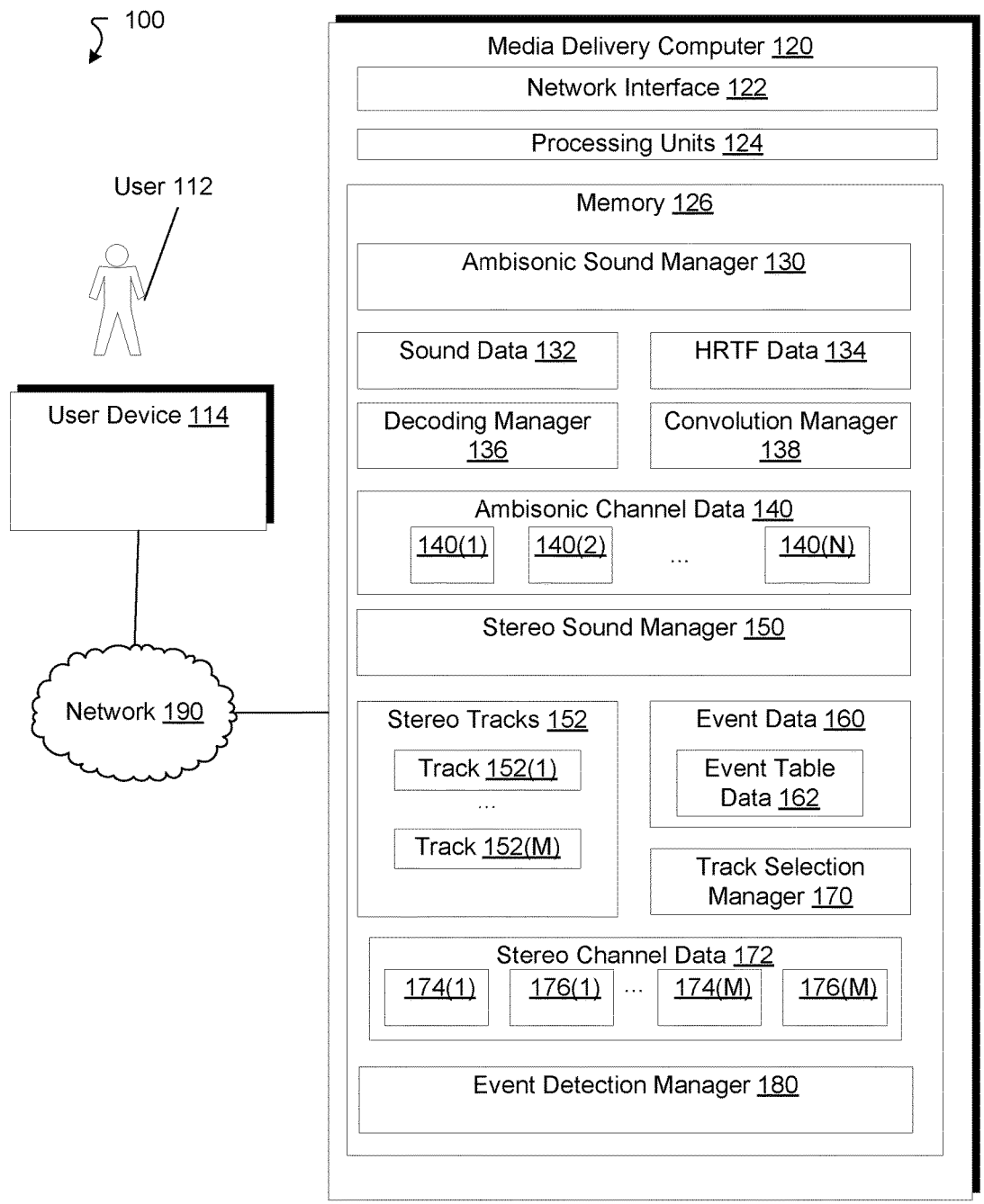
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a media delivery computer 120, a network 190, and a user device 114.

The media delivery computer 120 is configured to provide audio, video, and other media to the user 112 via the user device 114 in an immersive electronic environment. The media delivery computer 120 includes a network interface 122, one or more processing units 124, and memory 126. The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the media delivery computer 120 can be, or can include processors (e.g., processing units 124) configured to process instructions stored in the memory 126. Examples of such instructions as depicted in FIG. 1 include an ambisonic sound manager 130, a decoding manager 136, a convolution manager 138, a stereo sound manager 150, a track selection manager 170, and an event detection manager 180. Further, as illustrated in FIG. 1, the memory 126 is configured to store various data, which is described with respect to the respective managers that use such data.

The ambisonic sound manager 130 is configured to acquire sound data 132 from various sources and produce ambisonic sound from the sound data 132. For example, the ambisonic sound manager 130 may acquire the sound data 132 from an optical drive or over the network interface 122. Once it acquires the sound data 132, the sound acquisition manager 130 is also configured to store the sound data 132 in memory 126. In some implementations, the ambisonic sound manager 130 streams the sound data 132 over the network interface 122.

In some implementations, the sound data 132 is encoded in B-format, or first-order ambisonics with four components, or spherical harmonics. In other implementations, the sound data 132 is encoded in higher-order ambisonics, e.g., to order L. In this case, there will be $(L+1)^2$ spherical harmonics.

The decoding manager 136 is configured to decode the sound data 132 acquired by the sound acquisition manager 130 to produce weights for each ambisonic channel at each loudspeaker. Each weight at each loudspeaker represents an amount of a spherical harmonic emitted by that loudspeaker corresponding to that ambisonic channel. The weights may be determined from the sound data 132 as well as loudspeaker position data.

The convolution manager 138 is configured to perform convolutions on the weights with the HRTF data 134 to produce a rendered ambisonic portion of the sound fields in both left and right ears of the listener. In FIG. 1 the rendered ambisonic portion of the sound field is output over N loudspeakers 140(1), . . . , 140(N), each representing an ambisonic channel.

The stereo sound manager 150 is configured to acquire stereo tracks 152 and event data 160. For example, the stereo sound manager 150 may acquire the stereo tracks 152 and event data 160 from an optical drive or over the network interface 122. Once it acquires the stereo tracks 152 and event data 160, the stereo sound manager 150 is also configured to store the stereo tracks 152 and event data 160 in memory 126. The stereo sound manager 150 is also configured to produce stereo sound from any of the tracks 152(1), . . . 152(M) based on the selection of one or more of the tracks 152(1) . . . 152(M) based on the event data 160 selected by the track selection manager 170.

The stereo tracks 152 each include audio data that, when processed by processing circuitry 124, output a stereo portion of the sound field to the ears of the human user 112 over a corresponding pair of stereo sound channels. The audio data might describe spoken text, music, and the like.

In contrast to the ambisonic portion of the sound field that requires convolutions with appropriate HRTFs for binaural rendering of the sound field in the ears of the human user 112, the stereo portion of the sound field requires no such convolutions are additional processing for binaural rendering. Rather, the loudspeakers over which the stereo tracks are played are assumed to be at each of the ears of the human user 112, e.g., headphone speakers. This then eliminates a significant computational burden and allows for the stereo portion of the sound field to be rendered at very little additional computational cost.

The stereo channel data 172 includes left channels 174(1), . . . , 174(M) and right channels 176(1), . . . , 176(M) that correspond, respectively, to channels over which the stereo portion of the sound field generated from the stereo tracks 152 are rendered in the left and right ears of the human user 112. These channels are in addition to the ambisonic channels, e.g., channels 140(1), . . . , 140(N).

The event data 160 includes values of parameters describing various events, the occurrence of which may cause the track selection manager 170 to select a track, e.g., track 152(1) to be played over a pair of stereo channels, e.g., 174(1) and 176(1). For example, one event may occur when the head of the human user 112 is oriented at +45 degrees from its symmetry axis. The event data 160 may then take the form, in one example, as an entry in a table 162 such as "HEAD ORIENTATION +45 TRACK 1." Such an entry in the table 162 may be generated from an XML metadata file associated with that track.

A second event may occur when the head of the human user 112 is oriented at −45 degrees; in that case, the event data 160 may take the form of an entry in the table 162, "HEAD ORIENTATION −45 TRACK 2." Again, such an entry may be generated from an XML metadata file associated with the track 152(2).

In some implementations, event data 160 for a particular track may depend on multiple conditions. For example, the event data 160 associated with track 152(1) may also depend on the time on a clock being equal to a specified timestamp. In this case, another entry in the table 162 might take the form "TIMESTAMP 21346 TRACK 1." In this case, the track 152(1) would begin playing when the head of the user 112 is oriented at +45 degrees and the time on some clock (e.g., clock internal to the media delivery computer) has a time equal to 21346 time units.

The track selection manager 170 is configured to perform a lookup operation in the event table 162 for an entry describing an event detected by the event detection manager 180. For example, suppose that the event detection manager 180 detects the head of the user 112 being oriented at −45 degrees. Then the track selection manager 170 would perform a lookup operation in the table 162 to find an entry with the value "HEAD ORIENTATION −45." The track selection manager would then record the identifier of the track listed in that entry, i.e., "TRACK 2," and cause the stereo sound manager 150 to play the track 152(1) over the channels 174(1) and 176(1).

In some implementations, the track selection manager 170 is also configured to perform a further lookup operation in the table 162 for additional entries having the same track identifier. In the example described above, there may be no such entries. However, suppose that the event detection manager 180 detects the head of the user 112 being oriented at +45 degrees. Then the track selection manager 170 would perform a lookup operation in the table 162 to find an entry with the value "HEAD ORIENTATION +45." The track selection manager 170 would record the identifier of the track listed in that entry, i.e., "TRACK 1." The track selection manager 170 may then perform an additional lookup on entries having the track identifier "TRACK 1." In this case, the track selection manager would locate the entry "TIMESTAMP 21346 TRACK 1" and defer playing the track 152(1) until the clock time equaled the specified time in the timestamp.

The event detection manager 180 is configured to detect events such as those described in the table 162. Accordingly, the event detection manager 180 may interact with, e.g., a video component of the media delivery device. Such an interaction is detailed in FIG. 2.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the media delivery computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the media delivery computer 120.

The components (e.g., modules, processing units 124) of the media delivery computer 120 can be configured to operate based on one or more platforms (e.g., one or more similar or different platforms) that can include one or more types of hardware, software, firmware, operating systems, runtime libraries, and/or so forth. In some implementations, the components of the media delivery computer 120 can be configured to operate within a cluster of devices (e.g., a server farm). In such an implementation, the functionality and processing of the components of the media delivery computer 120 can be distributed to several devices of the cluster of devices.

The components of the media delivery computer 120 can be, or can include, any type of hardware and/or software configured to process attributes. In some implementations, one or more portions of the components shown in the components of the media delivery computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the media delivery computer 120 can be, or can include, a software module configured for execution by at least one processor (not shown). In some implementations, the functionality of the components can be included in different modules and/or different components than those shown in FIG. 1.

Although not shown, in some implementations, the components of the media delivery computer 120 (or portions thereof) can be configured to operate within, for example, a data center (e.g., a cloud computing environment), a computer system, one or more server/host devices, and/or so forth. In some implementations, the components of the media delivery computer 120 (or portions thereof) can be configured to operate within a network. Thus, the components of the media delivery computer 120 (or portions thereof) can be configured to function within various types of network environments that can include one or more devices and/or one or more server devices. For example, the network 190 can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network 190 can include at least a portion of the Internet.

In some embodiments, one or more of the components of the media delivery computer 120 can be, or can include, processors configured to process instructions stored in a memory. For example, the ambisonic sound manager 130 (and/or a portion thereof), the decoding manager 136 (and/or a portion thereof), the convolution manager 138 (and/or a portion thereof), the stereo sound manager 150 (and/or a portion thereof), the track selection manager 170 (and/or a portion thereof), and the event detection manager 180 (and/or a portion thereof) can be a combination of a processor and a memory configured to execute instructions related to a process to implement one or more functions.

Figure 2:
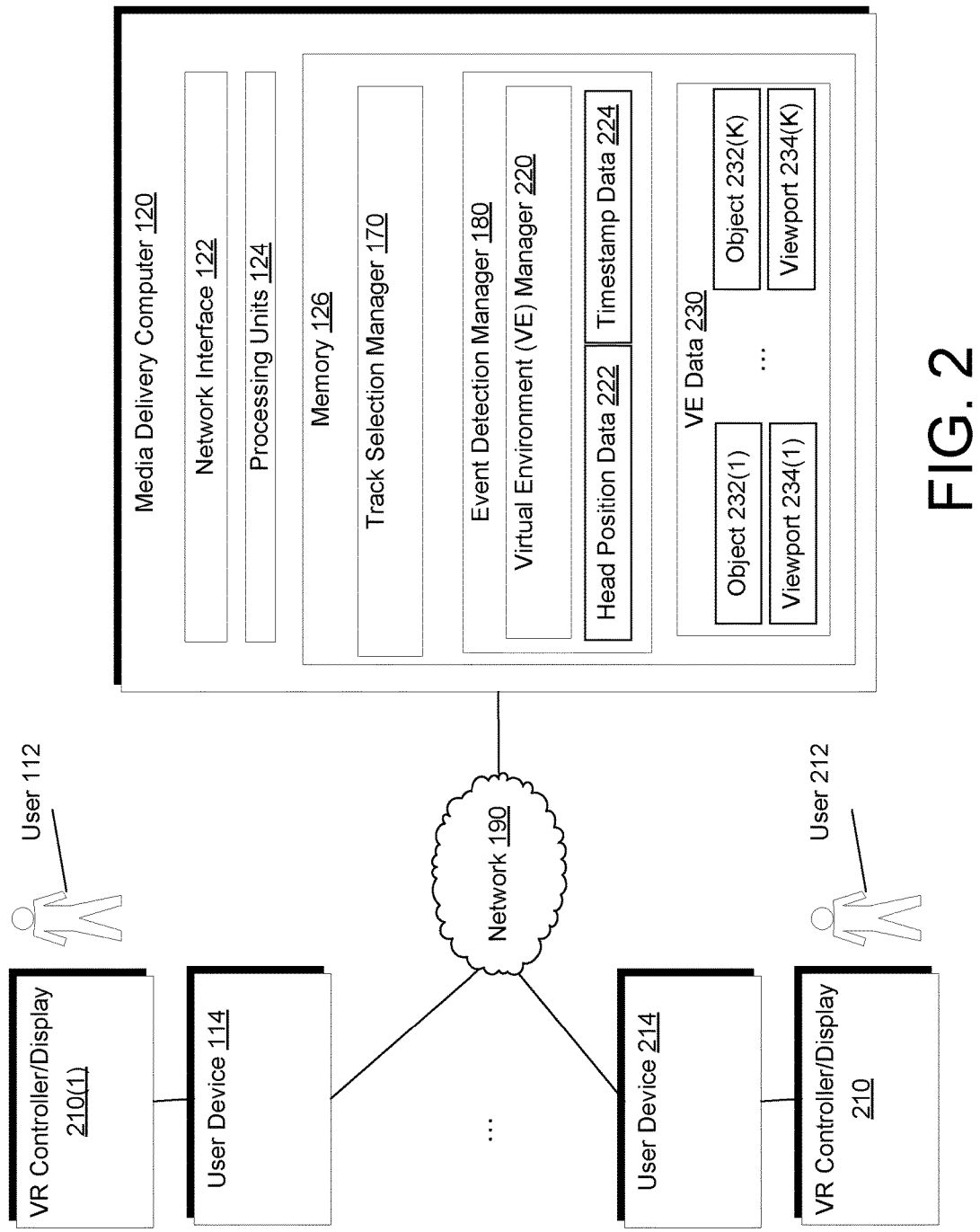
FIG. 2 is a diagram that illustrates another example electronic environment for implementing improved techniques described herein.

FIG. 2 illustrates the example media delivery computer 120 used in the specific case of providing virtual reality applications to the user 112 as well as other users, e.g., user 212. In this case, the event detection manager 180 includes a virtual environment (VE) manager 220 which is configured to interact with the user devices 114 and 214 over the network 190 to acquire various parameter values that define events. In performing this interaction, the VE manager 220 acquires data such as head position data 222 and timestamp data 224.

As illustrated in FIG. 2, the memory 126 of the media delivery computer 120 also stores VE data 230 that describes the virtual environment seen by the users 112 and 212. For example, a virtual environment typically includes many virtual objects 232(1), . . . , 232(K). Along these lines, suppose the virtual environment represents a virtual art museum. Then the objects 232(1), . . . , 232(K) may be various paintings on a wall. Each of the objects 232(1), . . . , 232(K) is located at a respective viewport (i.e., angle of sight) 234(1), . . . , 234(K).

Figure 3A:
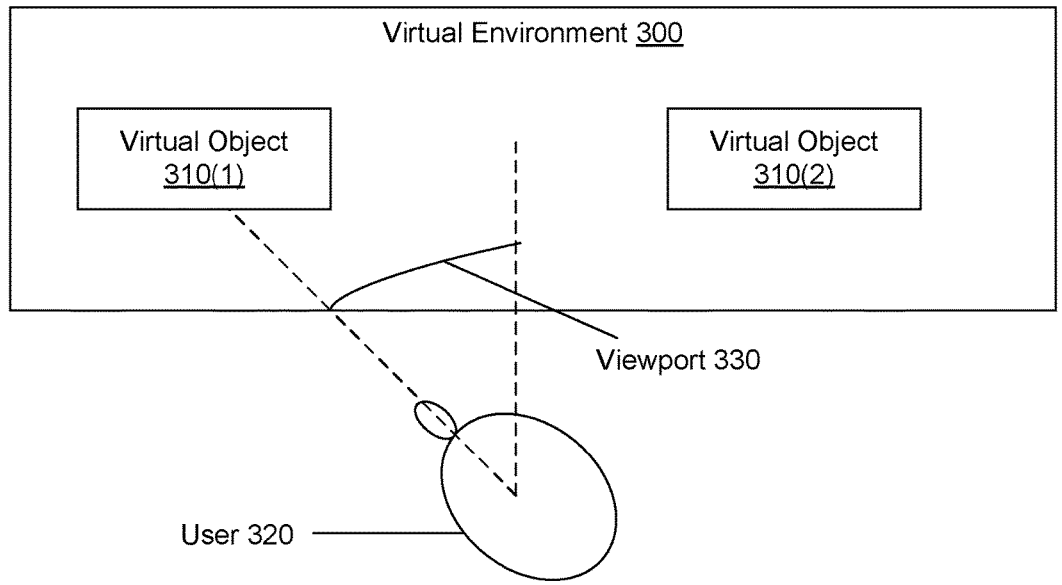
FIGS. 3A and 3B are diagrams that illustrate example event detections according to the improved techniques described herein.

FIG. 3A illustrates an example operation according to the improved techniques. Suppose that the user 320 is exploring a virtual museum 300 in virtual reality. There is a van Gogh 310(1) at a viewport 310 of −45 degrees with respect to the line of sight of user 320 and a Rembrandt at +45 degrees with respect to the line of sight of user 320. The event detection manager 180 is recording the positions of the head of user 320. When user 320 looks at the van Gogh, the position of the head of user 320 is at −45 degrees. The event detection manager 180 then sends a message to the track selection manager 170 "HEAD ORIENTATION −45." The track selection manager then plays the track 152(1) to user 320.

Figure 3B:
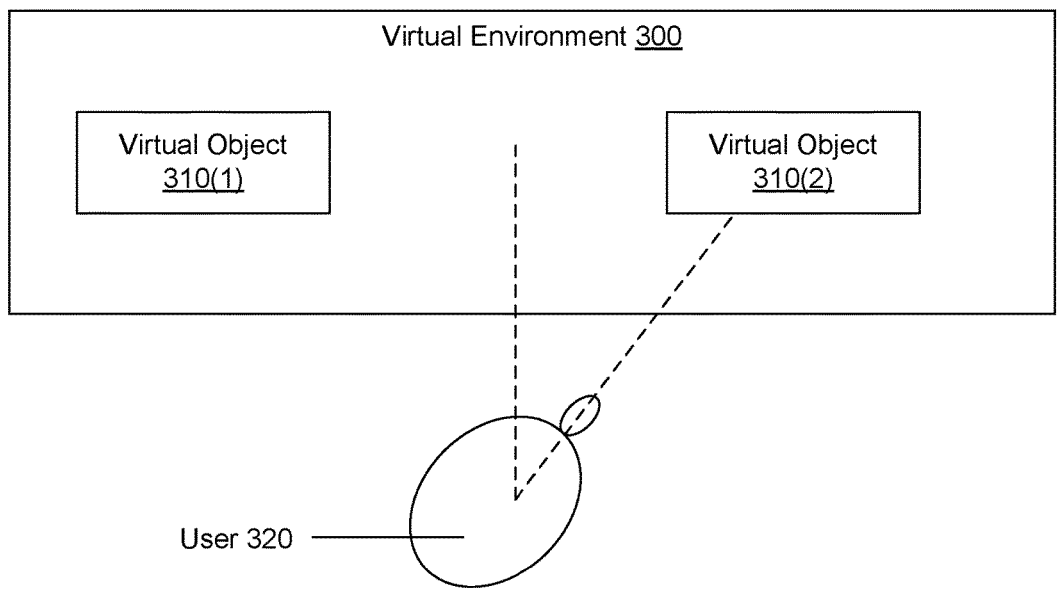

FIG. 3B illustrates another example operation according to the improved techniques. Suppose that the user 330 is exploring the virtual museum 300 in virtual reality. The event detection manager 180 is also recording the positions of the head of user 330. When user 330 looks at the Rembrandt, the position of the head of user 330 is at +45 degrees. The event detection manager 180 then sends a message to the track selection manager 170 "HEAD ORIENTATION +45." The track selection manager then plays the track 152(2) to user 330.

In the examples illustrated above, the media delivery computer 120 only plays a stereo track to the user who triggers the track selection. Thus, if users 320 and 30 were together, then user 330 would not hear track 152(10 and user 320 would not hear track 152(2). In other arrangements, however, this need not be the case and in those cases all users can hear any of the tracks when triggered.

Figure 4:
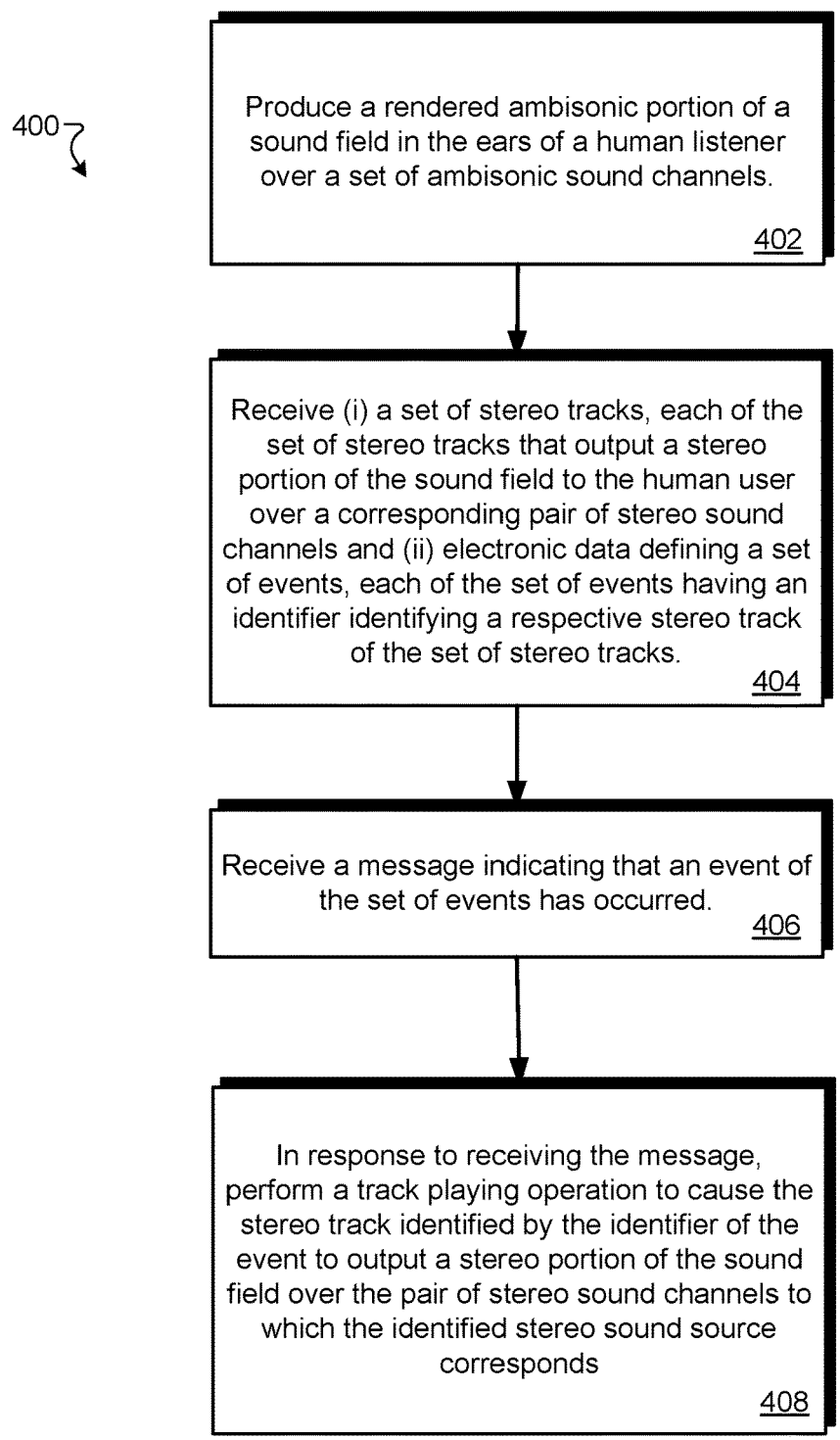
FIG. 4 is a flow chart that illustrates an example method of performing the improved techniques within the electronic environment shown in FIG. 1.

FIG. 4 is a flow chart depicting an example method 400 of producing a sound field in ears of a human user. The method 400 may be performed by software constructs described in connection with FIG. 1, which reside in memory 126 of the media delivery computer 120 and are run by the set of processing units 124.

At 402, the media delivery computer 120 performs a convolution operation on an ambisonic portion of a sound field being output to the ears of a human user over a set of ambisonic sound channels with a head-related transfer function (HRTF) for that ear to produce a rendered ambisonic portion of the sound field in the ears of the human listener over the set of ambisonic sound channels.

At 404, the media delivery computer 120 receives a set of stereo tracks and electronic data defining a set of events. Each of the set of stereo tracks includes audio data that, when processed by processing circuitry of the media delivery computer 120, output a portion of the sound field to the ears of the human user over a corresponding pair of stereo sound channels. Each of the set of events has an identifier identifying a respective stereo track of the set of stereo tracks.

At 406, the media delivery computer 120 receives a message indicating that an event of the set of events has occurred.

At 408, the media delivery computer 120 performs a track playing operation in response to receiving the message to cause the stereo track identified by the identifier of the event to output a stereo portion of the sound field over the pair of stereo sound channels to which the identified stereo sound source corresponds. The rendered ambisonic portion of the sound field and the stereo portion of the sound field are combined in the ears of the human user over the set of ambisonic sound channels and the pair of stereo sound channels.

Figure 5:
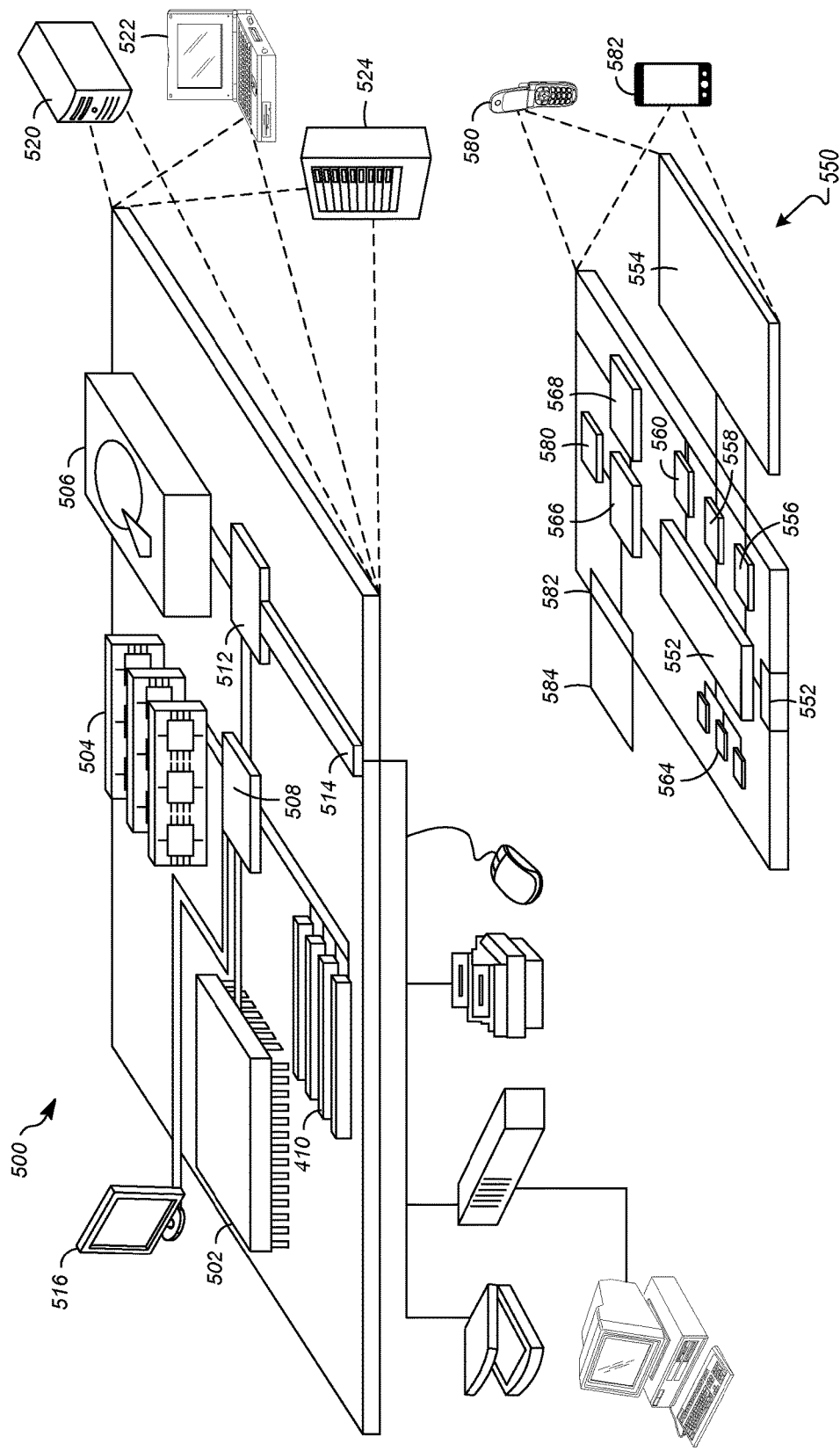
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of producing a sound field in ears of a human user, the method comprising:
    performing, by a media delivery computer configured to produce the sound field in the ears of the human user, a convolution operation on an ambisonic portion of the sound field being output to the ears of the human user over a set of ambisonic sound channels with a head-related transfer function (HRTF) to produce a rendered ambisonic portion of the sound field in the ears of the human listener over the set of ambisonic sound channels;
    receiving (i) a set of stereo tracks, each of the set of stereo tracks including audio data that, when processed by processing circuitry of the media delivery computer, output a portion of the sound field to the ears of the human user over a corresponding pair of stereo sound channels and (ii) electronic data defining a set of events, each of the set of events having an identifier identifying a respective stereo track of the set of stereo tracks;
    receiving a message indicating that an event of the set of events has occurred; and
    in response to receiving the message, performing a track playing operation to cause the stereo track identified by the identifier of the event to output a stereo portion of the sound field over the pair of stereo sound channels to which the identified stereo sound source corresponds, the rendered ambisonic portion of the sound field and the stereo portion of the sound field being combined in the ears of the human user over the set of ambisonic sound channels and the pair of stereo sound channels.

2. The method as in claim 1, wherein receiving the electronic data defining the set of events includes storing a set of metadata files in a memory device of the sound rendering computer, each of the metadata files including electronic data defining a respective event of the set of events.

3. The method as in claim 1, wherein the media delivery computer is further configured to produce an image of a virtual environment on eyes of the human user,
    wherein the method further comprises:
        detecting the event within the virtual environment; and
        generating, as the message indicating that the event has occurred, data identifying the event.

4. The method as in claim 3, wherein the event includes an indicator indicating that the head of the human user has an orientation equal to a specified angle, and
    wherein detecting the event within the virtual environment includes measuring the orientation of the head of the human user.

5. The method as in claim 3, wherein the event includes a timestamp, and
    wherein detecting the event within the virtual environment includes measuring the time within the virtual environment.

6. The method as in claim 3, wherein the media delivery computer is further configured to produce the image of a virtual environment on eyes of a set of other human users, and
    wherein performing the track playing operation includes outputting, to the ears of the human user only, the stereo portion of the sound field over the pair of stereo sound channels to which the identified stereo sound source corresponds.

7. The method as in claim 1, further comprising ceasing to perform the track playing operation after the event has occurred.

8. A computer program product comprising a non-transitory storage medium, the computer program product including code that, when executed by processing circuitry of a media delivery computer configured to produce a sound field in the ears of a human user, causes the processing circuitry to perform a method, the method comprising:
    performing a convolution operation on an ambisonic portion of the sound field being output to the ears of the human user over a set of ambisonic sound channels with a head-related transfer function (HRTF) to produce a rendered ambisonic portion of the sound field in the ears of the human listener over the set of ambisonic sound channels;
    receiving (i) a set of stereo tracks, each of the set of stereo tracks including audio data that, when processed by the processing circuitry of the media delivery computer, output a portion of the sound field to the ears of the human user over a corresponding pair of stereo sound channels and (ii) electronic data defining a set of events, each of the set of events having an identifier identifying a respective stereo track of the set of stereo tracks;
    receiving a message indicating that an event of the set of events has occurred; and in response to receiving the message, performing a track playing operation to cause the stereo track identified by the identifier of the event to output a stereo portion of the sound field over the pair of stereo sound channels to which the identified stereo sound source corresponds, the rendered ambisonic portion of the sound field and the stereo portion of the sound field being combined in the ears of the human user over the set of ambisonic sound channels and the pair of stereo sound channels.

9. The computer program product as in claim 8, wherein receiving the electronic data defining the set of events includes storing a set of metadata files in a memory device of the sound rendering computer, each of the metadata files including electronic data defining a respective event of the set of events.

10. The computer program product as in claim 8, wherein the media delivery computer is further configured to produce an image of a virtual environment on eyes of the human user, wherein the method further comprises:
    detecting the event within the virtual environment; and
    generating, as the message indicating that the event has occurred, data identifying the event.

11. The computer program product as in claim 10, wherein the event includes an indicator indicating that the head of the human user has an orientation equal to a specified angle, and
    wherein detecting the event within the virtual environment includes measuring the orientation of the head of the human user.

12. The computer program product as in claim 10, wherein the event includes a timestamp, and
    wherein detecting the event within the virtual environment includes measuring the time within the virtual environment.

13. The computer program product as in claim 10, wherein the media delivery computer is further configured to produce the image of a virtual environment on eyes of a set of other human users, and
    wherein performing the track playing operation includes outputting, to the ears of the human user only, the stereo portion of the sound field over the pair of stereo sound channels to which the identified stereo sound source corresponds.

14. The computer program product as in claim 8, wherein the method further comprises ceasing to perform the track playing operation after the event has occurred.

15. An electronic apparatus configured to produce a sound field in the ears of a human user, the electronic apparatus comprising:
    memory; and
    controlling circuitry coupled to the memory, the controlling circuitry being configured to:
        perform a convolution operation on an ambisonic portion of the sound field being output to the ears of the human user over a set of ambisonic sound channels with a head-related transfer function (HRTF) to produce a rendered ambisonic portion of the sound field in the ears of the human listener over the set of ambisonic sound channels;
        receive (i) a set of stereo tracks, each of the set of stereo tracks including audio data that, when processed by the controlling circuitry, output a portion of the sound field to the ears of the human user over a corresponding pair of stereo sound channels and (ii) electronic data defining a set of events, each of the set of events having an identifier identifying a respective stereo track of the set of stereo tracks;
        receive a message indicating that an event of the set of events has occurred; and
        in response to receiving the message, perform a track playing operation to cause the stereo track identified by the identifier of the event to output a stereo portion of the sound field over the pair of stereo sound channels to which the identified stereo sound source corresponds, the rendered ambisonic portion of the sound field and the stereo portion of the sound field being combined in the ears of the human user over the set of ambisonic sound channels and the pair of stereo sound channels.

16. The electronic apparatus as in claim 15, wherein the controlling circuitry configured to receive the electronic data defining the set of events is further configured to store a set of metadata files in a memory device of the sound rendering computer, each of the metadata files including electronic data defining a respective event of the set of events.

17. The electronic apparatus as in claim 15, wherein the electronic apparatus is further configured to produce an image of a virtual environment on eyes of the human user, wherein the controlling circuitry is further configured to:
    detect the event within the virtual environment; and
    generate, as the message indicating that the event has occurred, data identifying the event.

18. The electronic apparatus as in claim 17, wherein the event includes an indicator indicating that the head of the human user has an orientation equal to a specified angle, and
    wherein the controlling circuitry configured to detect the event within the virtual environment is further configured to measure the orientation of the head of the human user.

19. The electronic apparatus as in claim 17, wherein the event includes a timestamp, and
    wherein the controlling circuitry configured to detect the event within the virtual environment is further configured to measure the time within the virtual environment.

20. The electronic apparatus as in claim 17, wherein the electronic apparatus is further configured to produce the image of a virtual environment on eyes of a set of other human users, and
    wherein the controlling circuitry configured to perform the track playing operation is further configured to output, to the ears of the human user only, the stereo portion of the sound field over the pair of stereo sound channels to which the identified stereo sound source corresponds.

* * * * *